(12) United States Patent
Kim

(10) Patent No.: US 12,433,204 B2
(45) Date of Patent: Oct. 7, 2025

(54) LIGHT SOURCE FOR PLANT CULTIVATION AND METHOD FOR PLANT CULTIVATION

(71) Applicant: SEOUL VIOSYS CO., LTD., Gyeonggi-do (KR)

(72) Inventor: Se Ryung Kim, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 279 days.

(21) Appl. No.: 17/096,049

(22) Filed: Nov. 12, 2020

(65) Prior Publication Data
US 2021/0137021 A1    May 13, 2021

Related U.S. Application Data

(60) Provisional application No. 62/934,803, filed on Nov. 13, 2019.

(51) Int. Cl.
*A01G 22/15*    (2018.01)
*A01G 7/04*    (2006.01)

(52) U.S. Cl.
CPC ............ *A01G 7/045* (2013.01); *A01G 22/15* (2018.02)

(58) Field of Classification Search
CPC ........ A01G 7/045; A01G 22/15; A01G 9/249; A01H 3/02; H05B 47/16
USPC ..................................................... 47/58.1 LS
See application file for complete search history.

(56) References Cited

U.S. PATENT DOCUMENTS

| | | | |
|---|---|---|---|
| 2010/0287830 A1* | 11/2010 | Chen | H05B 45/20 362/1 |
| 2014/0325712 A1* | 10/2014 | Ogawa | A01N 37/46 530/331 |
| 2015/0128489 A1 | 5/2015 | Yamada et al. | |
| 2015/0128490 A1* | 5/2015 | Aikala | H01L 33/504 47/58.1 LS |

(Continued)

FOREIGN PATENT DOCUMENTS

| | | |
|---|---|---|
| CN | 104620876 A | 5/2015 |
| CN | 107614973 A | 1/2018 |

(Continued)

OTHER PUBLICATIONS

Qingwu Meng, Erik S. Runkle, Far-red radiation interacts with relative and absolute blue and red photon flux densities to regulate growth, morphology, and pigmentation of lettuce and basil seedlings, May 25, 2019, Scientia Horticulturae, vol. 255, pp. 269-280 (Year: 2019).*

(Continued)

*Primary Examiner* — Peter M Poon
*Assistant Examiner* — Sahar Almatrahi
(74) *Attorney, Agent, or Firm* — LaBatt, LLC

(57) ABSTRACT

A light source for plant cultivation and a plant cultivation method are provided. The plant cultivation method includes planting germinated seeds of a plant; and growing the plant by applying light treatment to the plant. In growing the plant, main light treatment of supplying main light to the plant and dark treatment of cutting off supply of the main light to the plant are alternated. The main light has at least two peak wavelengths in the visible light spectrum. In addition, the main light has a PPFD of greater than 92 μmol/m$_2$/s to less than 198 μmol/m$^2$/s.

20 Claims, 12 Drawing Sheets

(56) References Cited

U.S. PATENT DOCUMENTS

| | | | |
|---|---|---|---|
| 2016/0007544 | A1 | 1/2016 | Takashima et al. |
| 2016/0184237 | A1* | 6/2016 | Lowe .................. A61K 31/05 47/58.1 LS |
| 2018/0054974 | A1* | 3/2018 | Vasilenko .................. F21S 4/10 |
| 2019/0183034 | A1* | 6/2019 | Wargent .................. A01C 21/00 |
| 2022/0053707 | A1* | 2/2022 | de Wet .................... A01G 7/04 |

FOREIGN PATENT DOCUMENTS

| | | | |
|---|---|---|---|
| CN | 109890198 A | | 6/2019 |
| JP | H08103167 A | | 4/1996 |
| JP | 2006158262 A | | 6/2006 |
| JP | 2011097900 A | * | 5/2011 |
| JP | 2013066394 A | | 4/2013 |
| JP | 2016202050 | | 12/2016 |
| JP | WO2014162848 A | | 2/2017 |
| JP | 2018121589 | | 8/2018 |
| KR | 1020110073823 | | 6/2011 |
| KR | 1020130124703 | | 11/2013 |
| KR | 1020150027611 | | 3/2015 |
| KR | 20150061740 A | * | 6/2015 |
| WO | 2012090897 A1 | | 7/2012 |
| WO | 2019002946 A1 | | 1/2019 |

OTHER PUBLICATIONS

KR 20150061740 machine translation (Year: 2015).*
JP-2011097900-A_Machine-Translation (Year: 2011).*
International Search Report for International Application No. PCT/KR2020/015942, mailed Mar. 12, 2021.
Office action for Chinese Application No. 202080003301.3, Aug. 29, 2023, 20 pages.
Application No. EP 20 88 8607, Supplementary European Search Report dated Oct. 17, 2023, 9 pgs.
Pennisi, Giuseppina et al., "Resource use efficiency of indoor lettuce (*Lactuca sativa* L.) cultivation as affected by red:blue ration provided by LED lighting", natureesearch, Scientific Reports, Oct. 1, 2019, 11 pgs.
Lobiuc, Andrei et al., "Blue and Red LED Illumination Improves Growth and Bioactive Compounds Contents in Acyanic and Cyanic *Ocimum basilicum* L. Microgreens", MDPI Journal, Molecules 2017, Nov. 30, 2017, 14 pgs.
Owen, W. Garrett et al., "Red Leaf Lettuce", Greenhouse Grower, Jul. 2015, pp. 46-52.
Son, Ki-Ho et al., "Leaf Shape, Growth, and Antioxidant Phenolic Compounds of Two Lettuce Cultivars Grown under Various Combinations of Blue and Red Light-emitting Diodes", HortScience, vol. 48(8), Aug. 2013, pp. 988-995.
Haijie Dou et al., "Pre-Harvest UV-B Radiation and Photosynthetic Photon Flux Density Interactively Affect Plant Photosynthesis, Growth, and Secondary Metabolites Accumulation in Basil (*Ocimum basilicum*) Plants", MDPI Journal, Agronomy, Aug. 7, 2019, 19 pgs.
Tsormpatsidis E. et al., "The influence of ultraviolet radiation on growth, photosynthesis and phenolic levels of green and red lettuce: potential for exploiting effects of ultraviolet radiation in a production system", Annals of Applied Biology, 156, Jul. 11, 2008, 10 pgs.
Office Action for Japanese Application No. 2022-528182, Oct. 21, 2024, 4 pages (no English translation available).

* cited by examiner

LIGHT SOURCE FOR PLANT CULTIVATION AND METHOD FOR PLANT CULTIVATION

CROSS-REFERENCE TO RELATED APPLICATION

This application claims priority from and the benefit of U.S. Provisional Patent Application No. 62/934,803, filed on Nov. 13, 2019, which is hereby incorporated by reference for all purposes as if fully set forth herein.

BACKGROUND

Field

Embodiments of the present disclosure relates to a light source for plant cultivation and a plant cultivation method.

Discussion of the Background

Plants produce organic matter from carbon dioxide and water using light energy through photosynthesis. Plants use chemical energy of organic matter obtained through photosynthesis as nutrients for growth.

One of symptoms of physiological disorder in plants, such as leafy vegetables and fruit vegetables, is tip burn, which is a phenomenon in which leaf tissue dies. Tip burn manifests as withering and browning tips on leaves, eventually leading to death of the leaves.

In order to reduce incidence of tip burn in plants, methods of controlling plant cultivation conditions, such as concentration of a nutrient solution and temperature, are mainly studied.

However, controlling the temperature of the entire space in which plants are cultivated may be expensive and energy intensive. In addition, controlling the concentration of a nutrient solution requires separate equipment analyzing each ion in the nutrient solution.

In view of the fact that the method of controlling temperature and the method of controlling concentration of a nutrient solution both may be costly, there is an urgent need fora practical solution to reduce incidence of tip burn.

The above information disclosed in this Background section is only for understanding of the background of the inventive concepts, and, therefore, it may contain information that does not constitute prior art.

SUMMARY

Embodiments of the present disclosure provide a light source for plant cultivation and a plant cultivation method which can minimize incidence of tip burn in a plant.

In addition, embodiments of the present disclosure provide a light source for plant cultivation and a plant cultivation method which can increase the content of phytochemicals in a plant while minimizing incidence of tip burn.

In accordance with one embodiment of the present disclosure, a plant cultivation method includes: planting germinated seeds of a plant; and growing the plant by applying light treatment to the plant.

In growing the plant, main light treatment of supplying main light to the plant and dark treatment of cutting off supply of the main light to the plant may be alternated.

The main light may have at least two peak wavelengths in the visible spectrum. In addition, the main light may have a greater than 92 PPFD ($\mu mol/m^2/s$) to less than 198 PPFD. PPFD stands for photosynthetic photon flux density.

For example, the plant may be lettuce.

The main light may have a first peak wavelength and a second peak wavelength. A luminous intensity at the first peak wavelength may be the same as a luminous intensity at the second peak wavelength.

The first peak wavelength may lie in the wavelength band of blue light and the second peak wavelength may lie in the wavelength band of red light.

In growing the plant, the main light treatment may be performed for 16 hours per day and the dark treatment may be performed for 8 hours per day.

Growing the plant may further include supplying auxiliary light in the UV spectrum to the plant.

Supplying the auxiliary light may be performed during the last main light treatment period.

Supplying the auxiliary light may include alternately performing auxiliary light treatment of supplying the auxiliary light to the plant and auxiliary light cut-off treatment.

In supplying the auxiliary light, each of the auxiliary light treatment and the auxiliary light cut-off treatment may be performed for 1 hour.

The auxiliary light may have a third peak wavelength in the wavelength band of UVB.

A luminous intensity at the third peak wavelength may be lower than a luminous intensity at the peak wavelengths in the visible spectrum.

In accordance with another embodiment of the present disclosure, a light source for plant cultivation includes a main light source emitting main light toward a plant, the main light having at least two peak wavelengths in the visible spectrum and having a greater than 92 PPFD ($\mu mol/m^2/s$) to less than 198 PPFD.

The main light source may be alternately turned on and off to alternate main light treatment of supplying the main light to the plant and dark treatment of cutting off supply of the main light to the plant.

For example, the plant may be lettuce.

The main light may have a first peak wavelength and a second peak wavelength. A luminous intensity at the first peak wavelength may be the same as a luminous intensity at the second peak wavelength.

The first peak wavelength may lie in the wavelength band of blue light and the second peak wavelength may lie in the wavelength band of red light.

The main light treatment may be performed for 16 hours per day and the dark treatment may be performed for 8 hours per day.

The light source may further include an auxiliary light source emitting auxiliary light in the UV spectrum toward the plant.

The auxiliary light may be UV light having a third peak wavelength in the wavelength band of UVB.

A luminous intensity at the third peak wavelength may be lower than a luminous intensity at the peak wavelengths in the visible spectrum.

The auxiliary light source may emit the auxiliary light during the last main light treatment period.

The auxiliary light source may be alternately turned on an off to alternate auxiliary light treatment of supplying the auxiliary light to the plant and auxiliary light cut-off treatment.

Each of the auxiliary light treatment and the auxiliary light cut-off treatment may be performed for 1 hour.

The light source for plant cultivation and the plant cultivation method according to the embodiments of the present disclosure can minimize incidence of tip burn in a plant by supplying visible light to the plant during cultivation of the plant.

In addition, the light source for plant cultivation and the plant cultivation method according to the embodiments of the present disclosure can achieve both minimization of incidence of tip burn and increase in phytochemical content by further supplying UV light to the plant for a predetermined period of time during supply of visible light to the plant.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
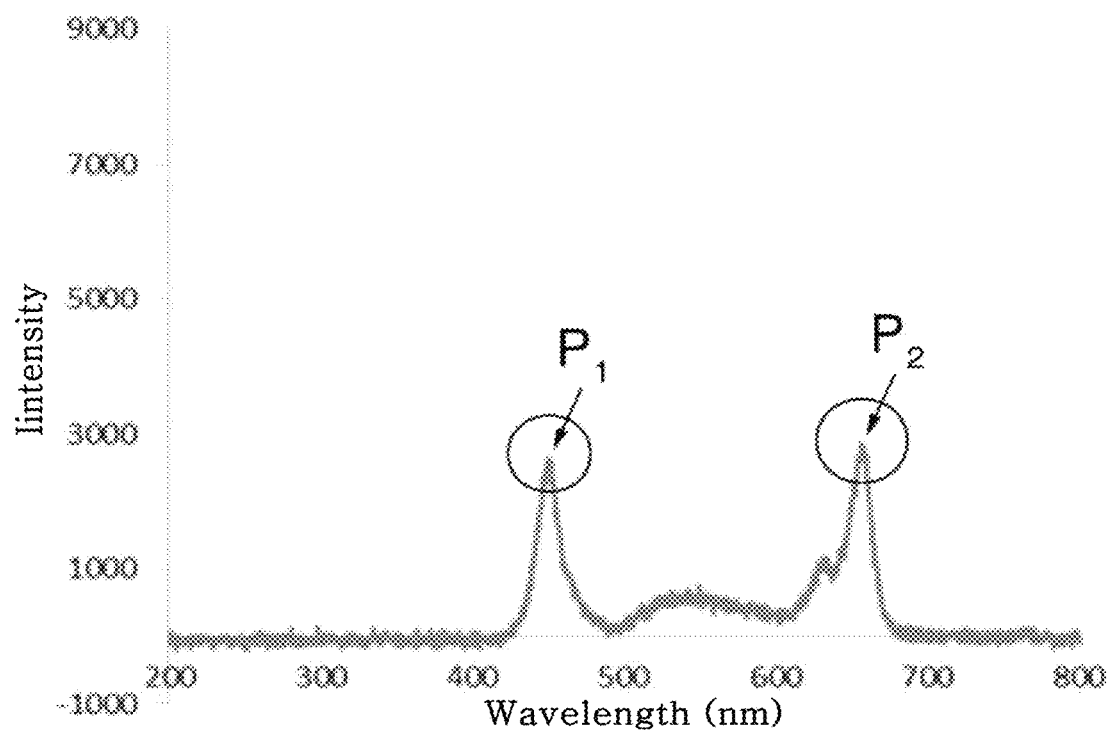
FIG. 1 is a graph showing optical spectrum of a main light source of 92 PPFD used in Experiment 1.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as control boards and control units. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Now, a light source for plant cultivation and a plant cultivation method which can minimize incidence of tip burn in plants will be described with reference to the accompanying drawings and experiments.

A plant used in the experiments of the present disclosure is green leaf lettuce.

Sterilized seeds of green leaf lettuce were sown on a hydroponic sponge and then grown using only purified water. After sowing, the seeds were grown under dark conditions for 3 days and then were grown and germinated under weak light conditions of 69.8 PPFD ($\mu mol/m^2/s$) for 7 days (from day 4 to day 10 after sowing). Then, the germinated seeds were planted in a deep flow technique (DFT) hydroponics system within which a nutrient solution was circulated, and then were grown for 20 days. Here, the nutrient solution was obtained by diluting Hoagland nutrient solution and had an acidity (pH) of 5.5 to 6.5 and a total salt concentration (EC) of 1.2 to 1.3 mS/cm.

During 20 days of cultivation, lettuce samples were grown at 22±1° C. and 70±5% RH. In addition, during cultivation, the lettuce samples were subjected to dark treatment for 8 hours per day and light treatment for 16 hours per day. Here, the light treatment refers to treatment of supplying light to a plant, and the dark treatment refers to treatment of cutting off supply of light to the plant. In this experiment, a main light source supplying light to the lettuce samples during the light treatment was a light source composed of LEDs. In addition, main light emitted from the main light source to be supplied to the lettuce samples was visible light in which red light, white light, and blue light are mixed in a ratio of 11:4:3.

Experiment 1

Experiment 1 was conducted to determine the growth, phytochemical content, and incidence of tip burn of lettuce depending on intensity of visible light used in lettuce cultivation.

In Experiment 1, multiple lettuce groups were exposed to light at different intensities during cultivation in the Deep Flow Technique (DFT) hydroponics system. That is, the intensity of visible light used in light treatment for 16 hours per day was set differently for each lettuce group. Each lettuce group consisted of 30 lettuce samples.

After harvesting the multiple lettuce groups cultivated at different light intensities, a leaf count, a count of tip burn-damaged leaves, fresh weight, chlorophyll content, and phytochemical content were measured for each lettuce group.

Experimental group 1 was a lettuce group cultivated at a 92 PPFD, Experimental group 2 was a lettuce group cultivated at a 152 PPFD, Experimental group 3 is a lettuce group cultivated at a 198 PPFD, and Experimental group 4 is a lettuce group cultivated at a 268 PPFD.

FIG. 1 to FIG. 4 are graphs showing optical spectrums of the main light source used in Experiment 1.

Figure 2:
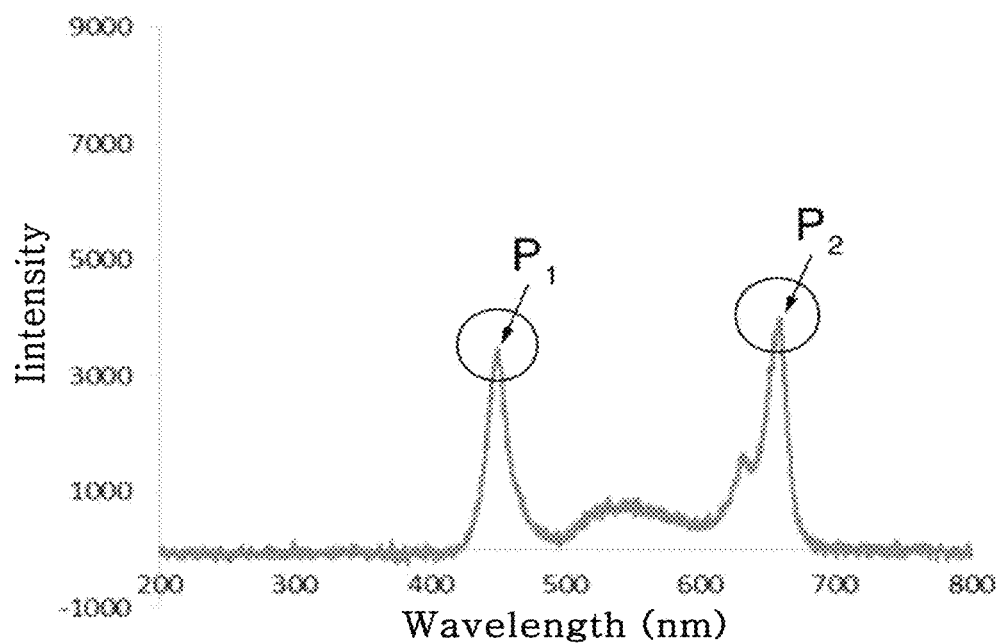
FIG. 2 is a graph showing optical spectrum of a main light source of 152 PPFD used in Experiment 1.
Figure 3:
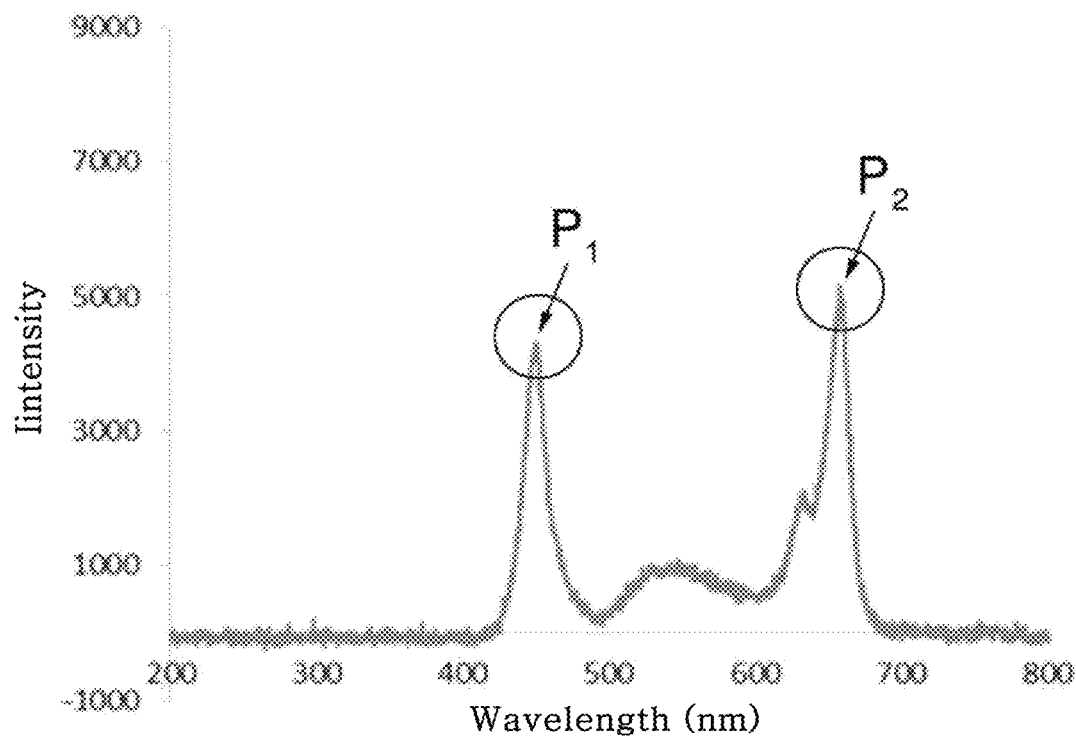
FIG. 3 is a graph showing optical spectrum of a main light source of 198 PPFD used in Experiment 1.
Figure 4:
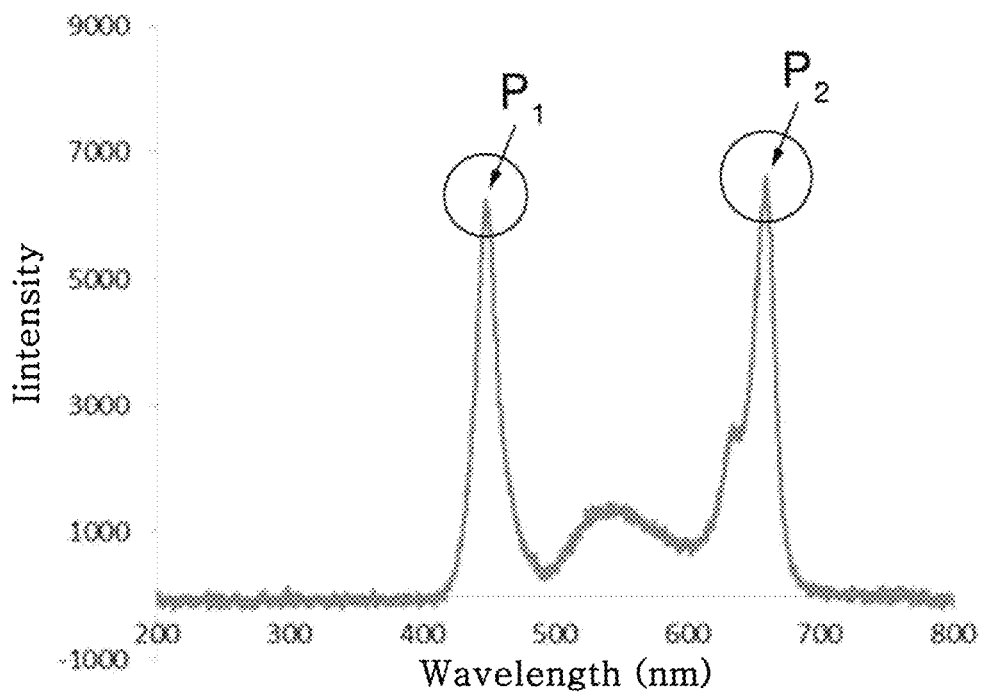
FIG. 4 is a graph showing optical spectrum of a main light source of 268 PPFD used in Experiment 1.

FIG. 1 is an optical spectrum of main light emitted from the main light source of 92 PPFD. FIG. 2 is an optical spectrum of main light emitted from the main light source of 152 PPFD. FIG. 3 is an optical spectrum of main light emitted from the main light source of 198 PPFD. FIG. 4 is an optical spectrum of main light emitted from the main light source of 268 PPFD.

Referring to FIG. 1 to FIG. 4, main light emitted from the main light source has a first peak wavelength $P_1$ at a wavelength of about 450 nm and a second peak wavelength $P_2$ at a wavelength of about 650 nm. In addition, a luminous intensity at the first peak wavelength $P_1$ is substantially the same as that at the second peak wavelength $P_2$. That is, red light and blue light components of the main light emitted from the main light source have the same luminous intensity.

FIG. 5 to FIG. 11 show results of experiment 1.

Figure 6:
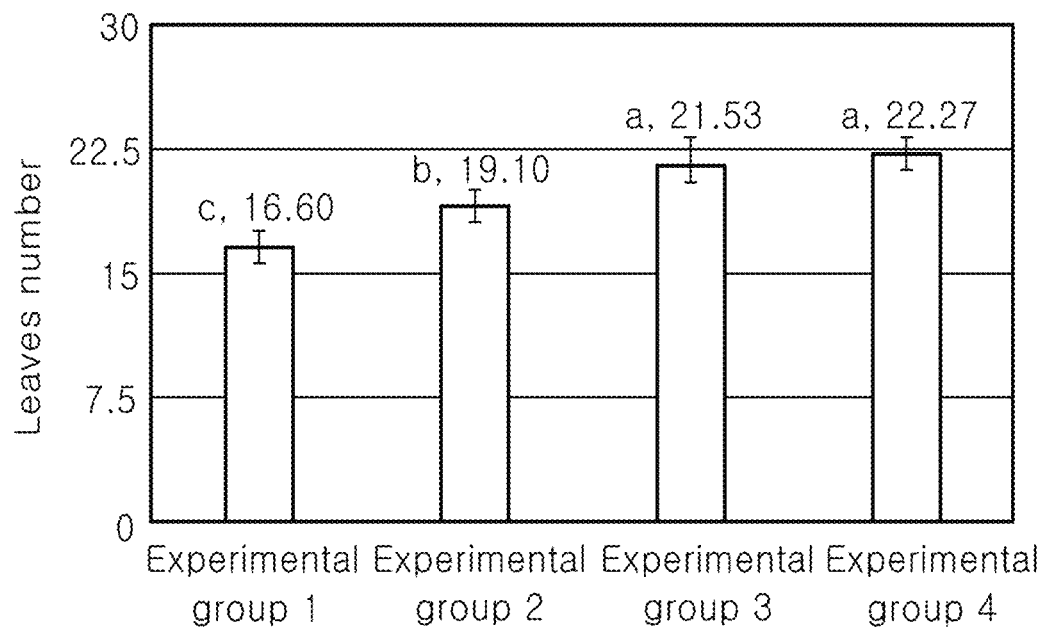
FIG. 6 is a graph showing the average number of leaves of lettuce samples of each Experimental group in Experiment 1.
Figure 7:
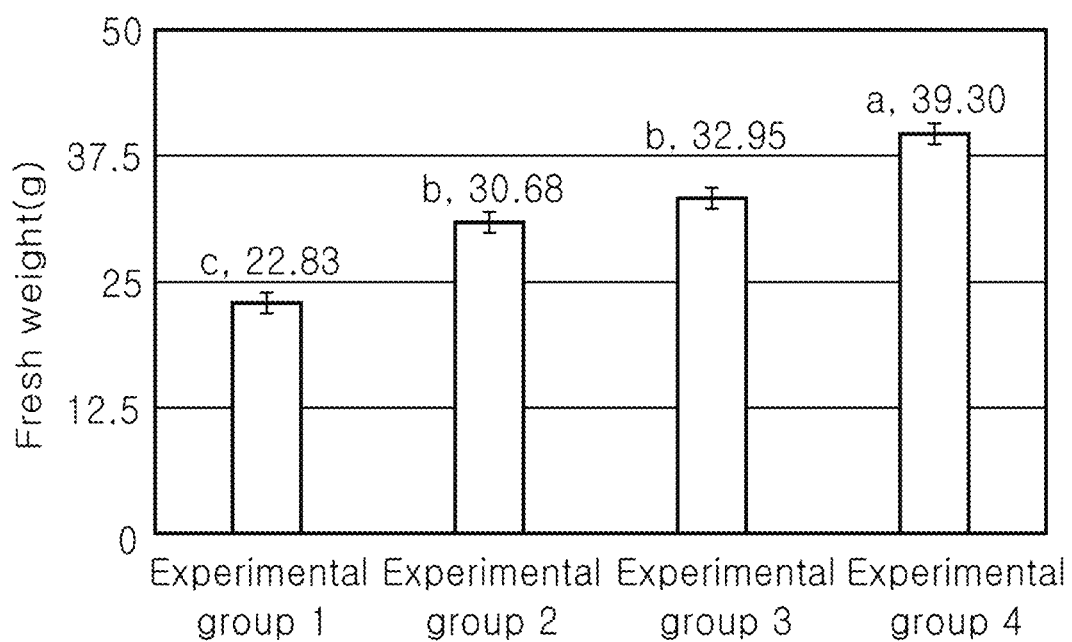
FIG. 7 is a graph showing the average fresh weight of lettuce samples of each Experimental group in Experiment 1.

FIG. 5A to FIG. 5D show images of some lettuce samples of each Experimental group for comparing growth of lettuce between Experimental groups. FIG. 6 is a graph showing an average count of leaves of lettuce samples of each Experimental group. FIG. 7 is a graph showing average fresh weight of lettuce samples of each Experimental group.

Figure 5A:
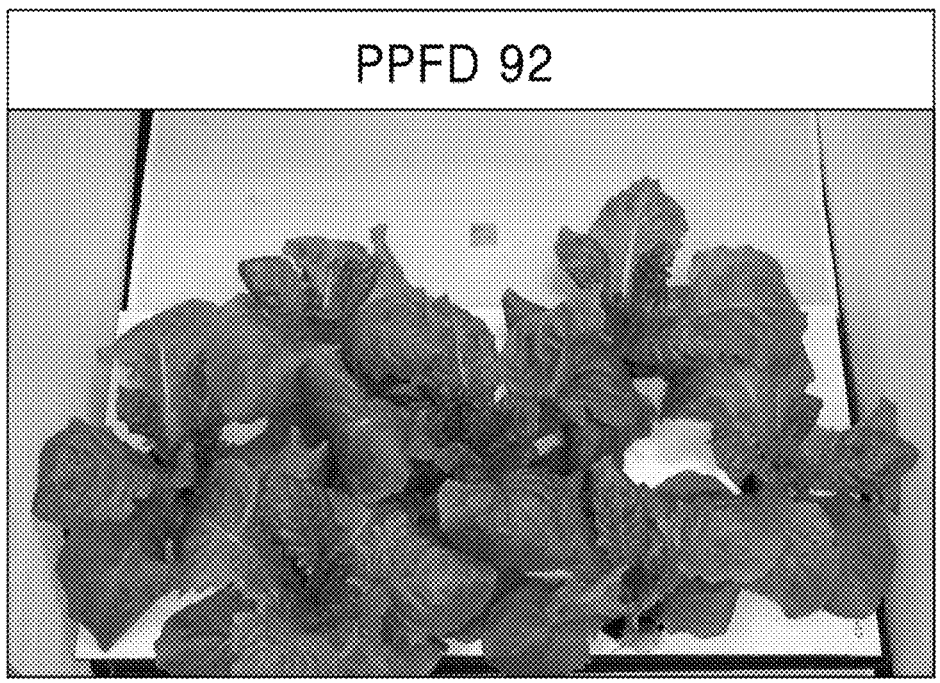
FIG. 5A shows an image of some lettuce samples of Experimental group 1 for comparing growth of lettuce between Experimental groups in Experiment 1.
Figure 5B:
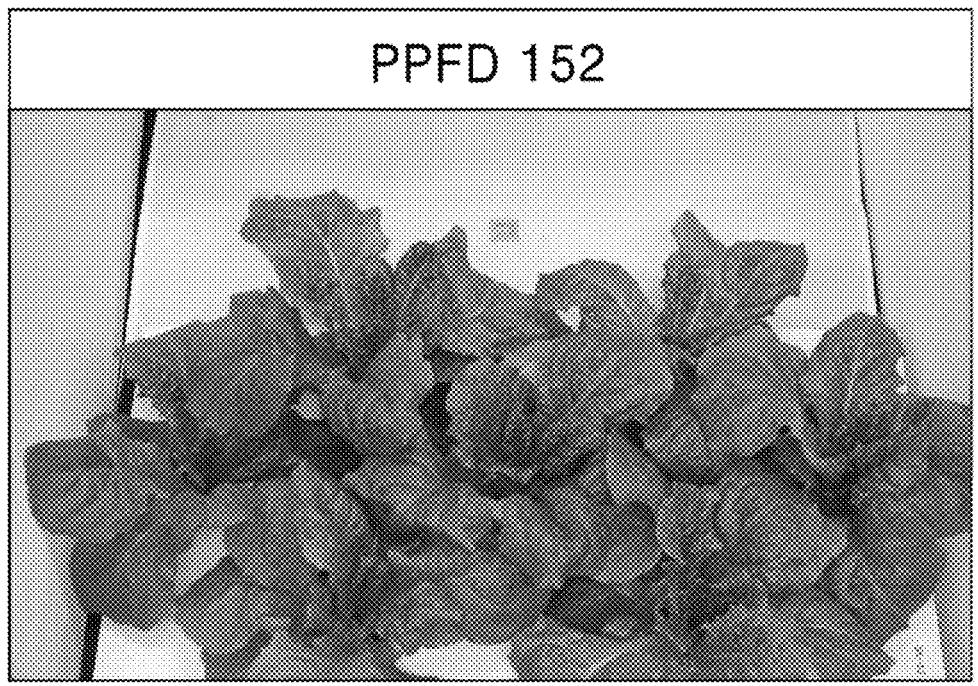
FIG. 5B shows an image of some lettuce samples of Experimental group 2 for comparing growth of lettuce between Experimental groups in Experiment 1.
Figure 5C:
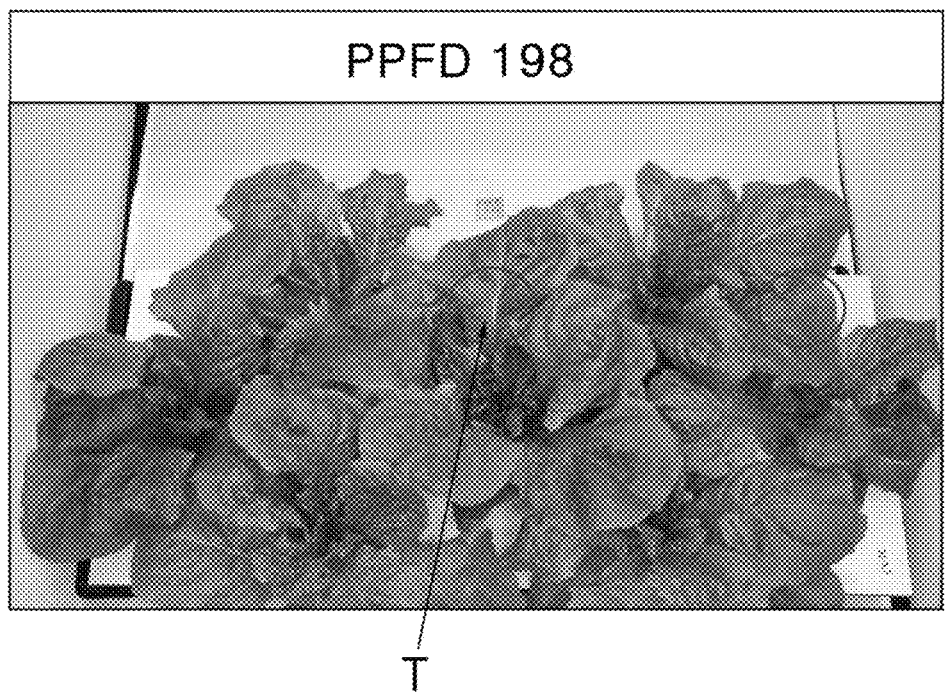
FIG. 5C shows an image of some lettuce samples of Experimental group 3 for comparing growth of lettuce between Experimental groups in Experiment 1.
Figure 5D:
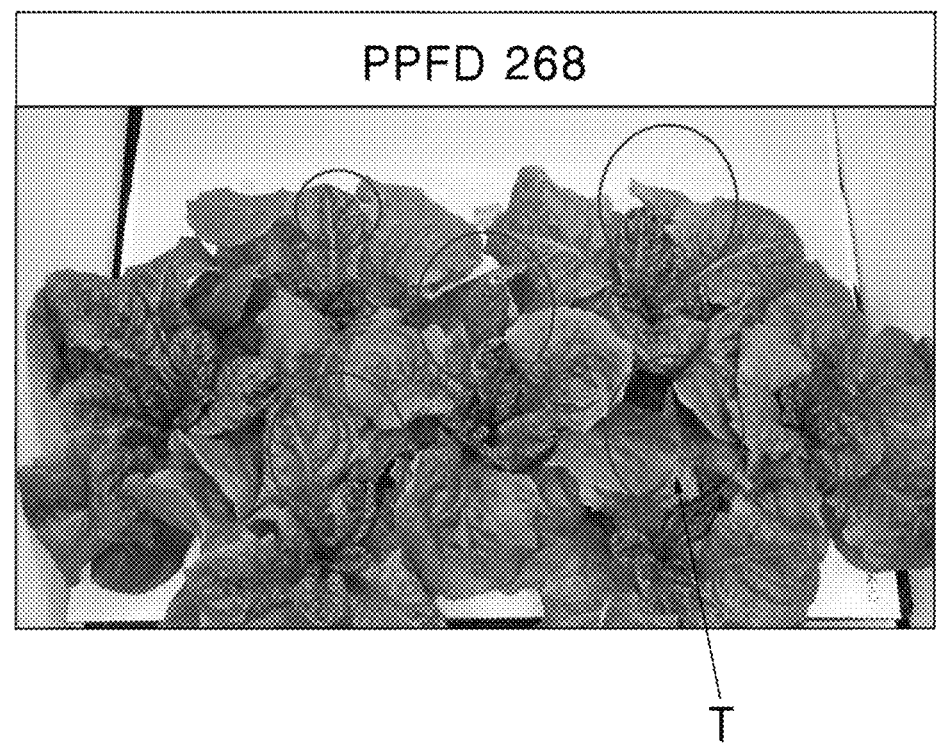
FIG. 5D shows an image of some lettuce samples of Experimental group 4 for comparing growth of lettuce between Experimental groups in Experiment 1.

Referring to FIG. 5A to FIG. 5D, it can be seen that the leaf size of lettuce increased from Experimental group 1 (FIG. 5A), Experimental group 2 (FIG. 5B), and Experimental group 3 (FIG. 5C) to Experimental group 4 (FIG. 5D). In addition, it can be seen that the number of tip burn-damaged leaves T increased from Experimental group 1 to Experimental group 4. That is, it can be seen that lettuce grows bigger and has a more increased count of tip burn-damaged leaves with increasing light intensity, as indicated with red circles labeled "T" in FIGS. 5C and 5D.

Referring to FIG. 6, the average count of leaves was 16.60 for Experimental group 1; 19.10 for Experimental group 2; 21.53 for Experimental group 3; and 22.27 for Experimental group 4. That is, the count of leaves showed a tendency of increasing as light intensity increases. However, there was a significant difference in the count of leaves between Experimental groups 1, 2, and 3, whereas there was no significant difference in the count of leaves between Experimental groups 3 and 4.

Referring to FIG. 7, the average fresh weight was 22.83 g for Experimental group 1; 30.68 g for Experimental group 2; 32.95 g for Experimental group 3; and 39.30 g for Experimental group 4. That is, the average fresh weight showed a tendency of increasing as light intensity increases. The average fresh weights of Experimental groups 2, 3 and 4 were higher than the average fresh weight of Experimental group 1. And the average fresh weight of Experimental group 4 was higher than the average fresh weights of Experimental group 2 and 3.

Referring to FIG. 6 and FIG. 7, the count of leaves and the fresh weight of Experimental group 2 both significantly increased, as compared with those of Experimental group 1. That is, significant improvement in growth of lettuce may be facilitated with a greater than 92 PPFD, which is the light intensity for Experimental group 1.

Figure 8:
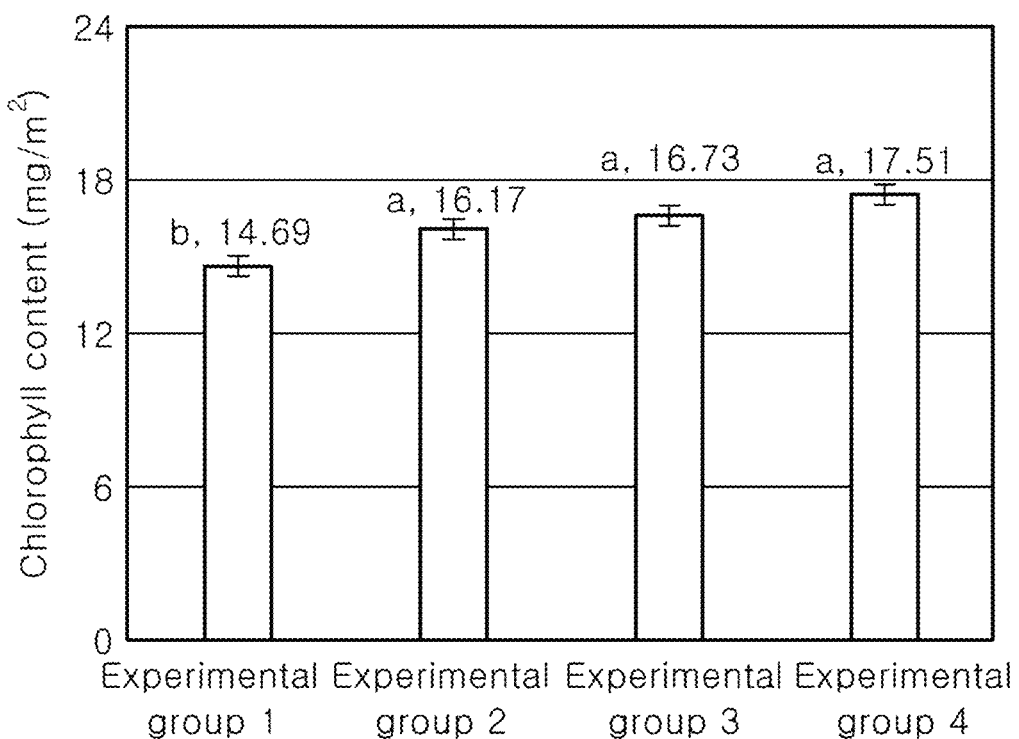
FIG. 8 is a graph showing the chlorophyll content of each Experimental group in Experiment 1.
Figure 9:
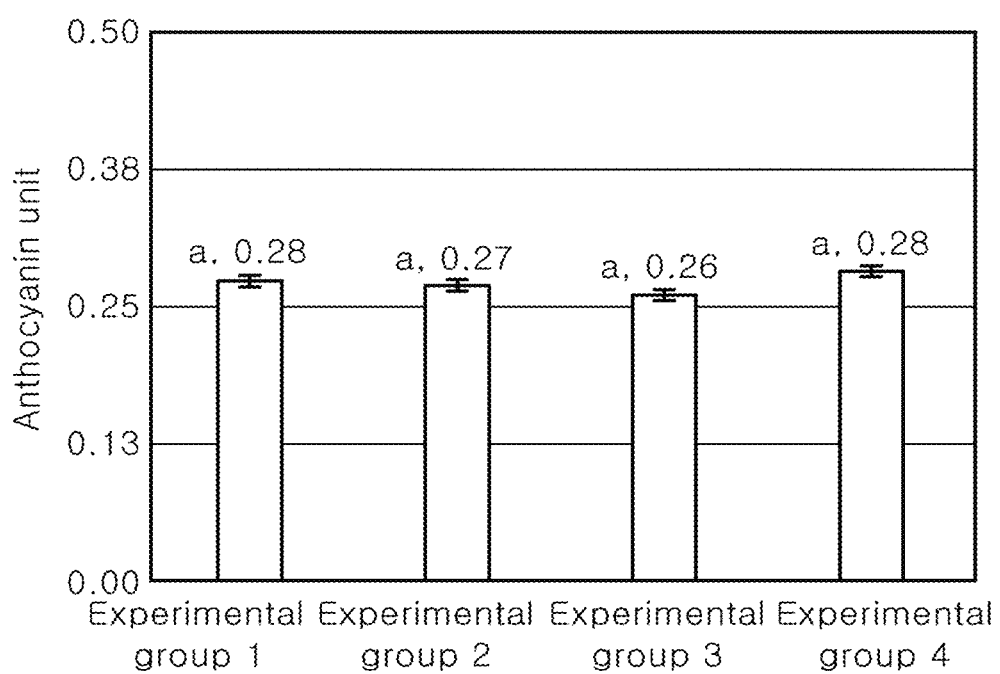
FIG. 9 is a graph showing the anthocyanin content of each Experimental group in Experiment 1.
Figure 10:
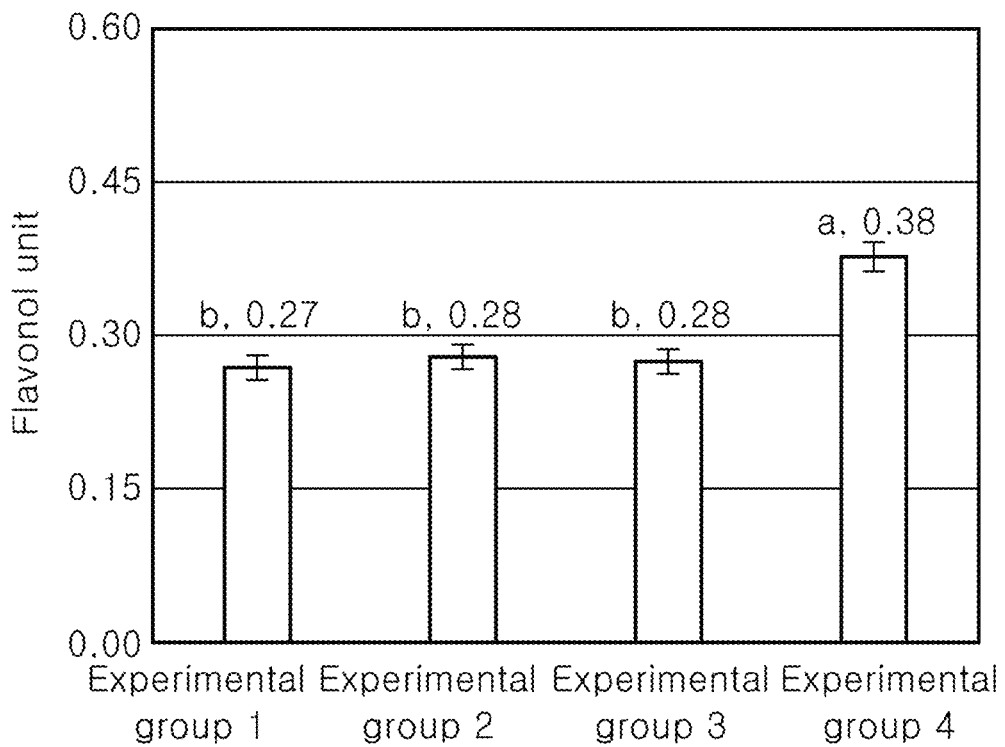
FIG. 10 is a graph showing the flavonol content of each Experimental group in Experiment 1.
Figure 11A:
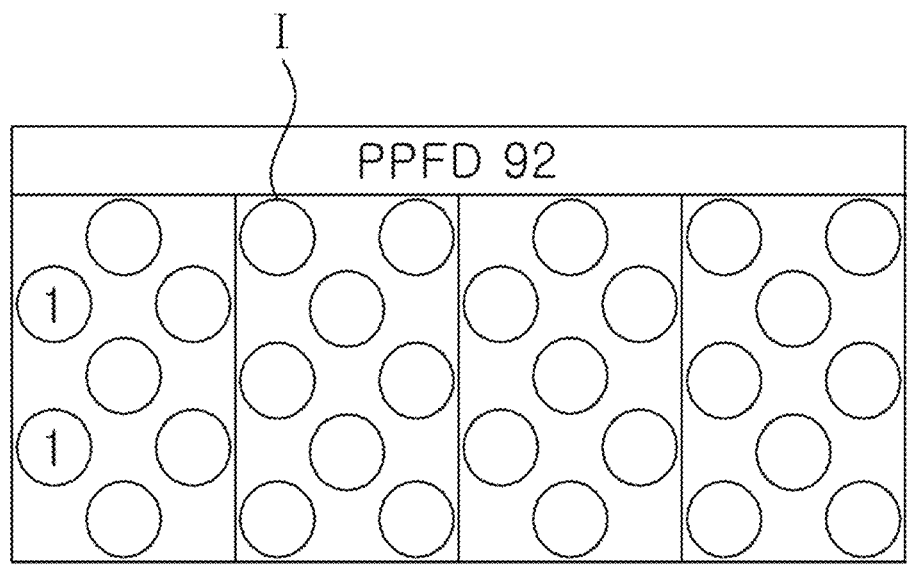
FIG. 11A shows the number of lettuce sample having tip burn in Experimental group 1 in Experiment 1.
Figure 11B:
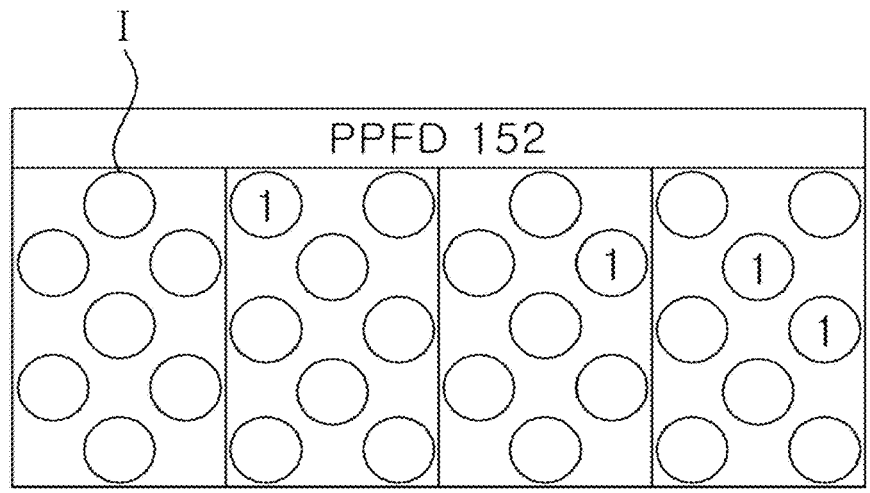
FIG. 11B shows the number of lettuce sample having tip burn in Experimental group 2 in Experiment 1.
Figure 11C:
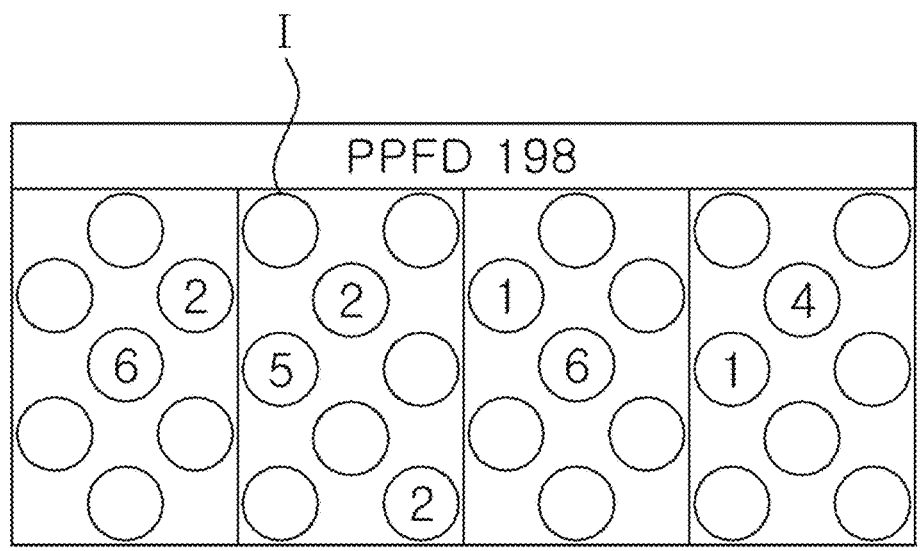
FIG. 11C shows the number of lettuce sample having tip burn in Experimental group 3 in Experiment 1.
Figure 11D:
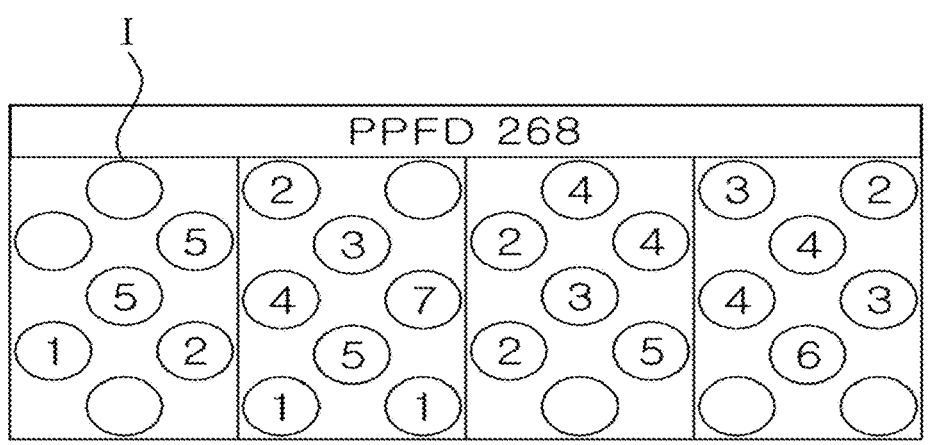
FIG. 11D shows the number of lettuce sample having tip burn in Experimental group 4 in Experiment 1.

FIG. 8 is a graph showing the chlorophyll content of each Experimental group. FIG. 9 and FIG. 10 are graphs showing the phytochemical content of each Experimental group. Specifically, FIG. 9 shows the anthocyanin content of each Experimental group. FIG. 10 shows the flavonol content of each Experimental group.

Referring to FIG. 8, the chlorophyll content is 14.69 mg/m$^2$ for Experimental group 1, 16.17 mg/m$^2$ for Experimental group 2, 16.73 mg/m$^2$ for Experimental group 3, and 17.51 mg/m$^2$ for Experimental group 4. In terms of chlorophyll content, there was a significant difference between Experimental groups 1 and 2, whereas there was no significant difference among Experimental groups 2, 3, and 4. That is, significant increase in photosynthetic efficiency of lettuce may be facilitated with the light intensity a greater than 92 PPFD.

Referring to FIG. 9, the anthocyanin content (unit) was 0.28 for Experimental group 1; 0.27 for Experimental group 2; 0.26 for Experimental group 3; and 0.28 for Experimental group 4. That is, change in light intensity did not cause a significant change in anthocyanin content.

Referring to FIG. 10, the flavonol content (unit) was 0.27 for Experimental group 1, 0.28 for Experimental group 2, 0.28 for Experimental group 3, and 0.38 for Experimental group 4. It can be seen that there was no considerable change in flavonol content between Experimental groups 1, 2, and 3, whereas the flavonol content of Experimental group 4 significantly increased, as compared with that of the other Experimental groups. That is, it can be seen that change from 92 PPFD to 198 PPFD did not cause considerable change in flavonol content, whereas change from 198 PPFD to 268 PPFD caused significant increase in flavonol content.

FIG. 11A to FIG. 11D shows a count of lettuce samples having tip burn in each Experimental group.

Referring to FIG. 11A to FIG. 11D, among 30 lettuce samples of each Experimental group, the number of samples having tip burn was 2 for Experimental group 1, 4 for Experimental group 2, 9 for Experimental group 3, and 23 for Experimental group 4. Here, in Experimental groups 1 and 2, samples having tip burn each had one tip burn-damaged leaf. However, in Experimental group 3, samples having tip burn each had 1 to 6 tip burn-damaged leaves and, in Experimental group 4, samples having tip burn each had 1 to 7 tip burn-damaged leaves.

Referring to FIG. 5 to FIG. 11, a greater than 92 PPFD may facilitate growth of lettuce. In addition, a greater than 92 PPFD may facilitate to maintain the phytochemical content of lettuce and, particularly, a greater than 198 PPFD may further facilitate to increase the flavonol content of lettuce. However, a less than 198 PPFD may facilitate to minimize incidence of tip burn in lettuce.

Therefore, when lettuce is cultivated at a greater than 92 PPFD to less than 198 PPFD, growth of the lettuce can be improved while maintaining the phytochemical content and minimizing incidence of tip burn.

Experiment 2

Experiment 2 was conducted to determine effects of use of an auxiliary light source during cultivation on the growth and phytochemical content of lettuce.

A main light used in Experiment 2 was a light source emitting visible light as main light that illuminates lettuce in a DFT hydroponics system for 16 hours per day. Based on the results of experiment 1, the main light source was set to emit visible light at an intensity determined in consideration of growth of lettuce, the phytochemical content of lettuce, and minimization of incidence of tip burn in lettuce. That is, in Experiment 2, the main light source had a 125 PPFD, which is greater than 92 PPFD and less than 198 PPFD.

Main light emitted from the main light source has peak wavelengths in the wavelength bands of red light and blue light, respectively. For instance, FIG. 2 provides the details of an optical spectrum of the main light emitted from the main light source as described here.

The auxiliary light source used in Experiment 2 was a light source emitting UV light in the wavelength band of Ultraviolet B ("UVB"). The auxiliary light source was used to provide auxiliary light, that is, UV light, to lettuce during the last light treatment period just before harvest. Here, in order to prevent damage to the lettuce due to continuous exposure to the auxiliary light, that is, UV light, auxiliary light treatment and auxiliary light cut-off treatment were alternated at predetermined intervals. Here, the auxiliary light treatment refers to treatment of supplying the auxiliary light to the lettuce used in Experiment 2 and the auxiliary light cut-off treatment refers to treatment of cutting off supply of the auxiliary light to the lettuce used in Experiment 2.

In Experiment 2, the auxiliary light source was turned on and off alternately at intervals of 1 hour. That is, the auxiliary light treatment and the auxiliary light cut-off treatment were alternated at intervals of 1 hour. Here, the total cumulative dose of UV radiation delivered to the lettuce was 4.03 kJ/m$^2$.

Figure 12:
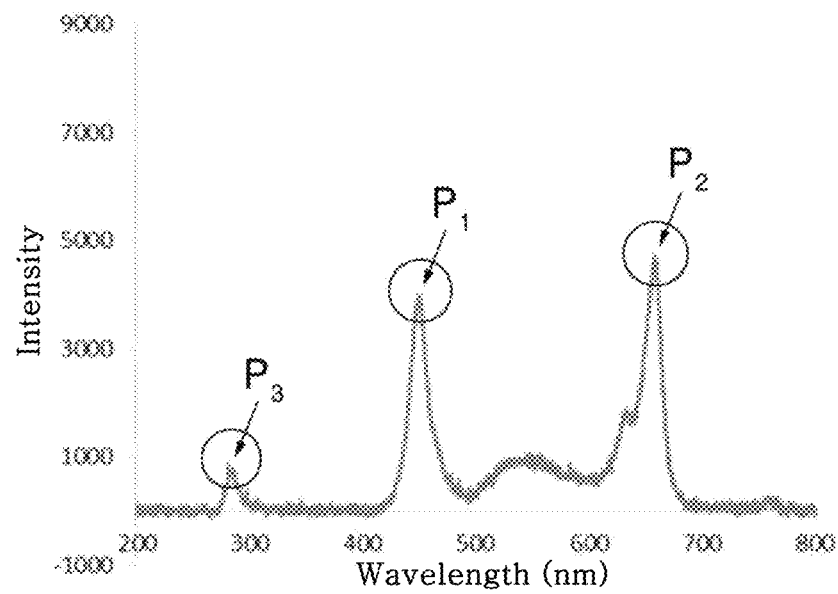
FIG. 12 is a graph showing an optical spectrum of mixed light of main light and auxiliary light used in Experiment 2.

FIG. 12 is a graph showing an optical spectrum of mixed light of the main light and the auxiliary light used in Experiment 2. Referring to FIG. 12, the mixed light of the main light and the auxiliary light had a first peak wavelength P1 at a wavelength of about 450 nm, a second peak wavelength $P_2$ at a wavelength of about 650 nm, and a third peak wavelength $P_3$ at a wavelength of 290 nm and 320 nm, which corresponds to the wavelength band of UVB. Here, a luminous intensity at the third peak wavelength P3 is higher than those at the first peak wavelength P1 and the second peak wavelength P2.

In Experiment 2, the fresh weight, chlorophyll content, flavonol content, and anthocyanin content of lettuce were compared between lettuce groups with and without auxiliary light during cultivation in the DFT hydroponics system.

A control group was a lettuce group subjected to light treatment with the main light source during cultivation.

An Experimental group was a lettuce group subjected to both light treatment with the main light source and light treatment with the auxiliary light source during cultivation.

As a result of the experiment, there was no significant difference in fresh weight between the control group and the Experimental group. That is, it can be seen that UV radiation at the wavelength and dose used in Experiment 2 does not affect growth of lettuce.

Figure 13:
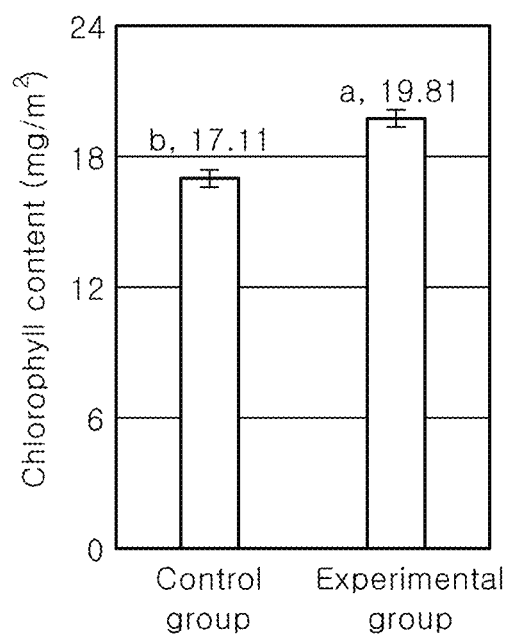
FIG. 13 is a graph showing the chlorophyll content of lettuce samples in Experiment 2.
Figure 14:
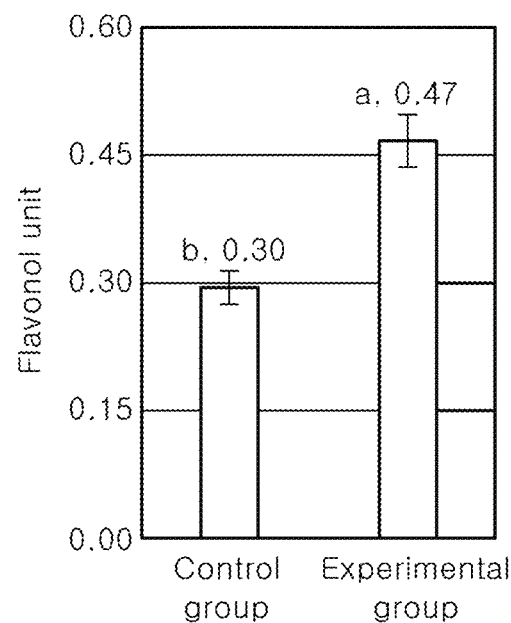
FIG. 14 is a graph showing the flavonol content of lettuce samples in Experiment 2.
Figure 15:
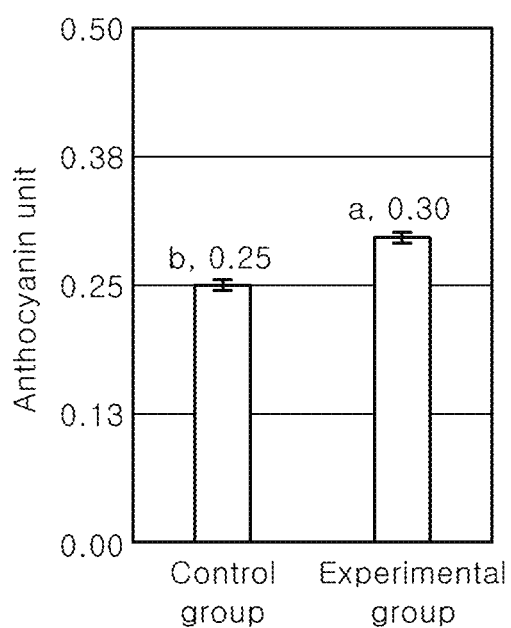
FIG. 15 is a graph showing the anthocyanin content of lettuce samples in Experiment 2.

FIG. 13 to FIG. 15 show results of Experiment 2 related to the content of phytochemicals.

FIG. 13 is a graph showing chlorophyll content. FIG. 14 is a graph showing flavonol content. FIG. 15 is a graph showing anthocyanin content.

Referring to FIG. 13, the control group had a chlorophyll content of 17.11 mg/m$^2$ and the Experimental group had a chlorophyll content of 19.81 mg/m$^2$. That is, the chlorophyll content of the Experimental group increased by 15.8%, as compared with that of the control group.

Referring to FIG. 14, the control group had a flavonol content (unit) of 0.30 and the Experimental group had a flavonol content of 0.47. That is, the flavonol content of the Experimental group increased by 56.7%, as compared with that of the control group.

Referring to FIG. 15, the control group had an anthocyanin content (unit) of 0.25 and the Experimental group had an anthocyanin content of 0.30. That is, the anthocyanin content of the Experimental group increased by 20.0%, as compared with that of the control group.

Through Experiment 2, it can be seen that UV light in the wavelength band of UVB can increase the content of phytochemicals in lettuce without reduction in growth.

Through Experiments 1 and 2, it can be seen that use of a light source emitting visible light having a greater than 92 PPFD to less than 198 PPFD and a light source emitting UV light in the wavelength band of UVB in cultivation of lettuce can increase the content of phytochemicals without affecting growth of lettuce while minimizing incidence of tip burn.

Experiment 3

Hydroponics allows a plant to be quickly supplied with nutrients through roots thereof exposed to a nutrient solution. When the plant is also supplied with main light having 198 PPFD or more, the plant can grow at an extremely high rate due to quick supply of nutrients and supply of the main light having high intensity. This results in poor supply of trace elements or other elements necessary for growth, thus causing incidence of tip burn in the plant.

Sunlight has 198 PPFD or more, and a plant cultivated by hydroponics using sunlight can suffer from tip burn. UV light can act as a stress factor on plants, causing poor growth of the plants.

Accordingly, for a plant cultivated under irradiation with visible light having 198 PPFD or more, additional UVB irradiation can suppress overgrowth of the plant or incidence of tip burn due to an extremely high growth rate of the plant.

In Experiment 3, UVB as auxiliary light was additionally supplied to a plant while supplying the plant with main light having 198 PPFD or more.

When a plant grows at an extremely high rate due to irradiation with visible light having 198 PPFD or more, supply of UV light at a level that does not damage the plant can allow control over the growth rate of the plant, thereby potentially preventing incidence of tip burn.

A light source for plant cultivation used in Experiment 3 may include a main light source emitting main light, that is, visible light having 198 PPFD or more, and an auxiliary light source emitting auxiliary light, that is, UVB.

Figure 16:
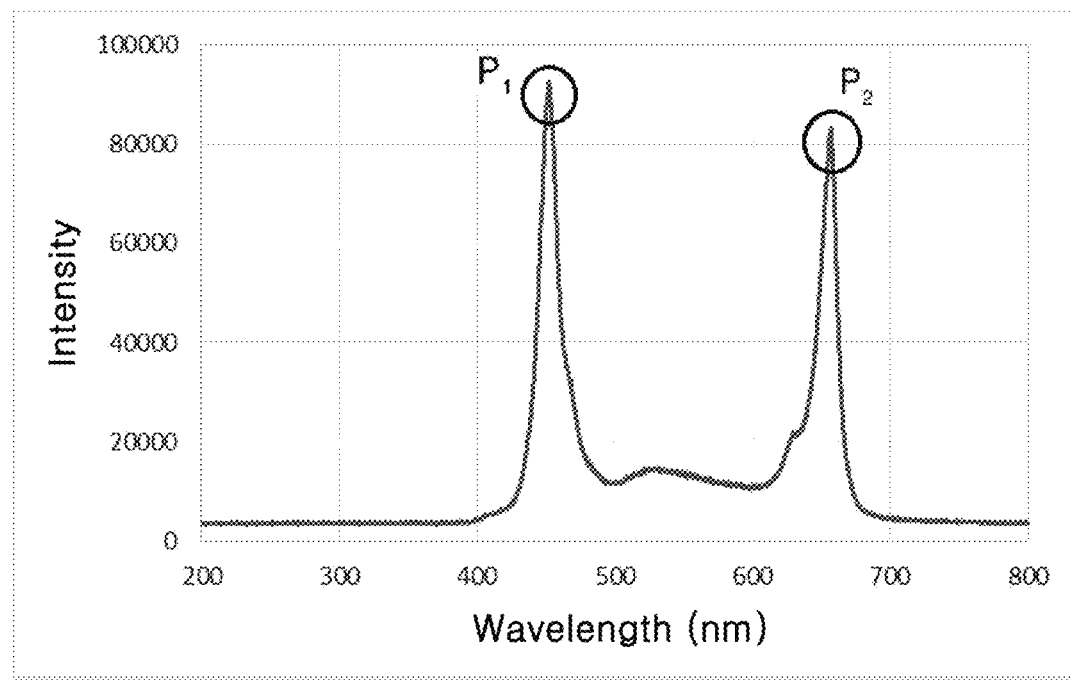
FIG. 16 shows an optical spectrum of a main light source emitting visible light having 198 PPFD or more.

FIG. 16 shows an optical spectrum of the main light source emitting visible light having 198 PPFD or more.

Referring to FIG. 16, main light emitted from the main light source has a first peak wavelength $P_1$ at a wavelength of about 450 nm and a second peak wavelength $P_2$ at a wavelength of about 650 nm.

The auxiliary light source may supply the plant with auxiliary light which is UVB having a peak in the wavelength range of 280 nm to 290 nm or in the wavelength range of 305 nm to 315 nm.

For example, the light source for plant cultivation may irradiate the plant with auxiliary light in one of the above wavelength ranges while irradiating the plant with the main light.

Figure 17:
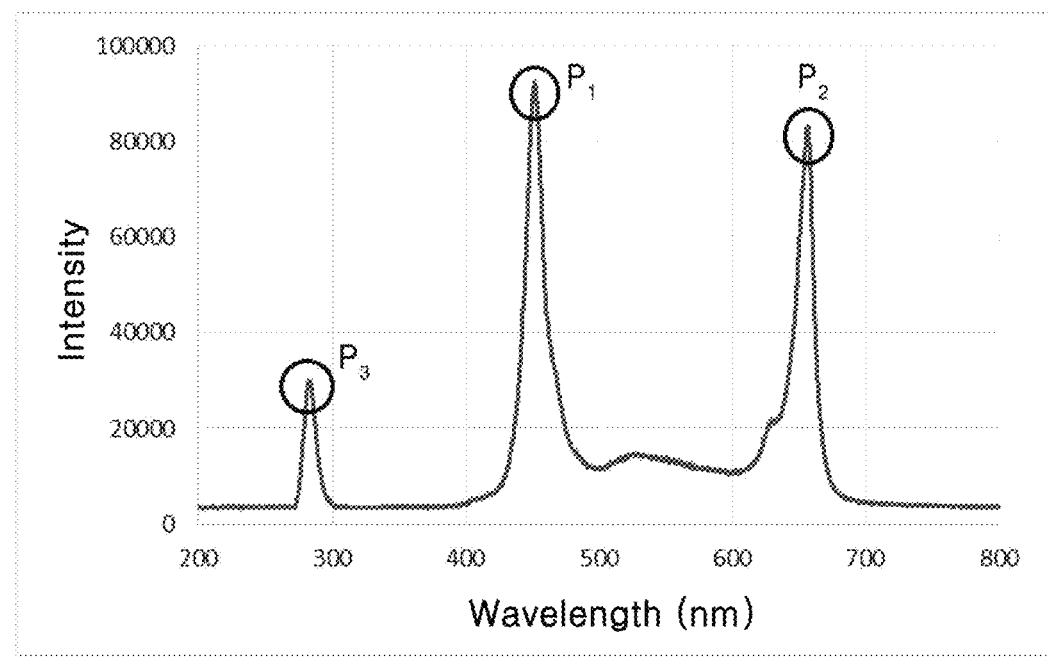
FIG. 17 shows a spectrum of mixed light of main light having 198 PPFD or more and auxiliary light having a peak P3 at a wavelength of 280 nm to 290 nm.
Figure 18:
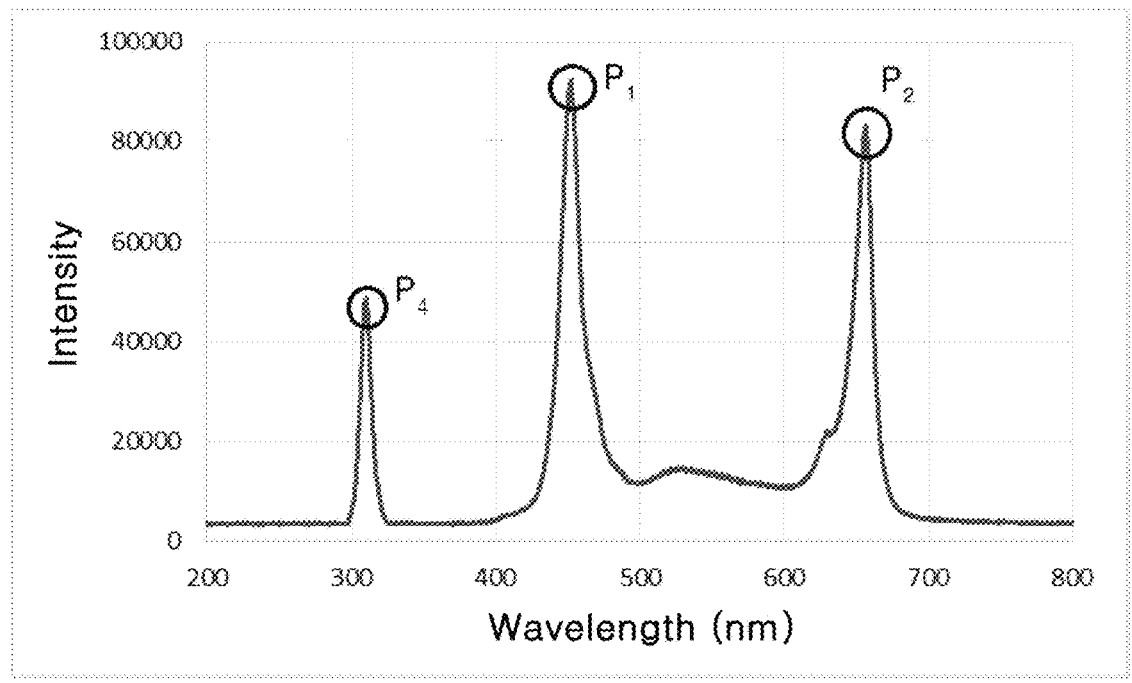
FIG. 18 shows a spectrum of mixed light of main light having 198 PPFD or more and auxiliary light having a peak P4 at a wavelength of 305 nm to 315 nm.

Here, light to which the plant is exposed may have a spectrum as shown in FIG. 17 and FIG. 18.

FIG. 17 shows a spectrum of mixed light of main light having 198 PPFD or more and auxiliary light having a peak $P_3$ at a wavelength of 280 nm to 290 nm.

FIG. 18 shows a spectrum of mixed light of main light having 198 PPFD or more and auxiliary light having a peak $P_4$ at a wavelength of 305 nm to 315 nm.

Alternatively, the light source for plant cultivation may irradiate the plant with a mixture of auxiliary light in the two different wavelength ranges while irradiating the plant with the main light.

Figure 19:
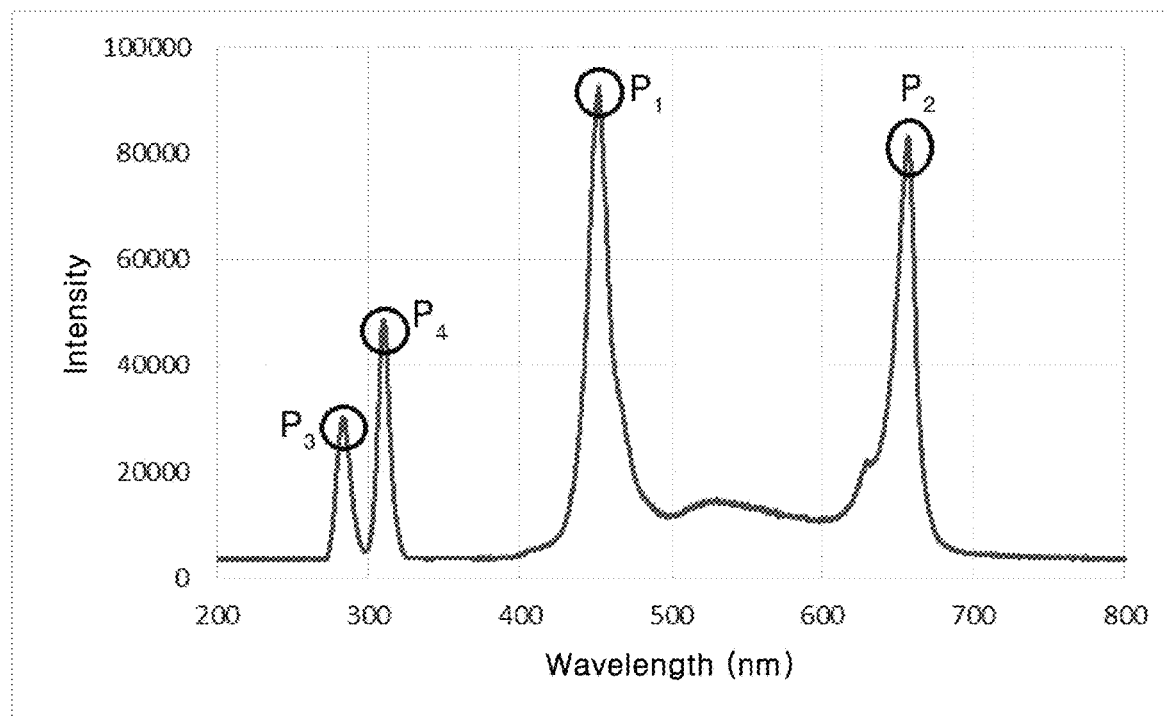
FIG. 19 shows a spectrum of mixed light of main light having 198 PPFD or more, auxiliary light having a peak P3 at a wavelength of 280 nm to 290 nm, and auxiliary light having a peak P4 at a wavelength of 305 nm to 315 nm.

FIG. 19 shows a spectrum of mixed light of main light having 198 PPFD or more, auxiliary light having a peak $P_3$ at a wavelength of 280 nm to 290 nm, and auxiliary light having a peak $P_4$ at a wavelength of 305 nm to 315 nm.

Here, the auxiliary light source may irradiate the plant with auxiliary light having different wavelengths at the same time.

Alternatively, the auxiliary light source may irradiate the plant with auxiliary light having different wavelengths in the order of decreasing wavelength.

Potential energy increases with decreasing wavelength. In addition, the risk of damage to a plant increases with increasing potential energy of light to which the plant is exposed.

Accordingly, the plant may be irradiated first with light having lower potential energy to build up resistance to the light, followed by irradiation with light having higher potential energy, whereby damage to the plant can be minimized.

Thus, the auxiliary light source may provide shorter wavelength UVB radiation to the plant after providing longer wavelength UVB radiation to the plant.

As demonstrated through Experiment 3, use of UVB as auxiliary light in a hydroponics system using sunlight can increase the phytochemical content of a plant without potentially sacrificing growth of the plant while minimizing incidence of tip burn in the plant.

Although some embodiments have been described herein, it should be understood that these embodiments are provided for illustration only and are not to be construed in any way as limiting the present disclosure. The scope of the present disclosure should be defined by the appended claims and equivalents thereto.

What is claimed is:

1. A plant cultivation method comprising:
    planting germinated seeds of a selected plant in a hydroponics system, wherein the selected plant comprises lettuce; and
    alternately performing main light treatment and dark treatment,
    the main light treatment supplying main light to the selected plant, and
    the dark treatment cutting off supply of the main light to the selected plant;
    wherein the main light has at least two peak wavelengths in a visible light spectrum and an intensity of the main light has a greater than 198 PPFD (μmol/m²/s); and
    supplying auxiliary light in an UV spectrum to the selected plant, wherein the auxiliary light includes a highest peak wavelength in the UV spectrum having an auxiliary peak luminous intensity between ⅕ and ⅔ an intensity of each of two of the at least two peak wavelengths in the visible light spectrum, and
    wherein the two of the at least two peak wavelengths include a range of wavelengths located therebetween having a maximum luminous intensity at least three times lower than each of the two of the at least two peak wavelengths.

2. The plant cultivation method according to claim 1, wherein the main light has a first peak wavelength and a second peak wavelength, and a first peak luminous intensity at the first peak wavelength is substantially the same as a second peak luminous intensity at the second peak wavelength.

3. The plant cultivation method according to claim 2, wherein the first peak wavelength falls in a wavelength band of blue light and the second peak wavelength falls in a wavelength of red light.

4. The plant cultivation method according to claim 1, wherein growing the selected plant further comprises: performing the main light treatment for 16 hours per day and performing the dark treatment for 8 hours per day.

5. The plant cultivation method according to claim 1, wherein the main light includes a third peak wavelength located between the first and second peak wavelengths, the third peak wavelength having a third peak luminous intensity three to six times lower than a first peak luminous intensity at a first peak wavelength of the at least two peak wavelengths of the main light and a second peak luminous intensity at a second peak wavelength of the at least two peak wavelengths of the main light.

6. The plant cultivation method according to claim 1, wherein the alternately performing the main light treatment and the dark treatment further comprises repeatedly performing the main light treatment for a predetermined main light treatment period; wherein the supplying the auxiliary light further comprises supplying the auxiliary light during a last main light treatment period prior to harvesting of the selected plant.

7. The plant cultivation method according to claim 1, wherein the supplying the auxiliary light further comprises alternately performing auxiliary light treatment of supplying the auxiliary light to the selected plant and auxiliary light cut-off treatment.

8. The plant cultivation method according to claim 7, wherein the supplying the auxiliary light further comprises alternately performing the auxiliary light treatment for one hour and the auxiliary light cut-off treatment one hour.

9. The plant cultivation method according to claim 1, wherein the highest peak wavelength is in a wavelength band of Ultraviolet A, and wherein the supplying the auxiliary light comprises supplying UV light having a third peak wavelength in a wavelength band of Ultraviolet B (UVB).

10. The plant cultivation method according to claim 9, wherein a third peak luminous intensity at the third peak wavelength is lower than the auxiliary peak luminous intensity at the highest peak wavelength.

11. A light source for plant cultivation, comprising:
    a main light source configured for emitting main light toward a selected plant in a hydroponics system, wherein the selected plant is indicated as comprising lettuce, the main light having at least two peak wavelengths in a visible light spectrum and having an intensity greater than 198 PPFD (μmol/m²/s), and an auxiliary light source configured for emitting auxiliary light toward the selected plant, the auxiliary light includes a highest peak wavelength in an ultraviolet (UV) spectrum, the highest peak wavelength having an auxiliary peak luminous intensity-ne between ⅕ and ⅔ a luminous intensity of each of two of the at least two peak wavelengths in the visible light spectrum, wherein the two of the at least two peak wavelengths include a range of wavelengths located therebetween having a maximum luminous intensity at least three times lower than each of the two of the at least two peak wavelengths, and wherein the main light source is turned on and off to alternate main light treatment of supplying the main light to the selected plant and dark treatment of cutting off supply of the main light to the selected plant.

12. The light source according to claim 11, wherein the main light has a first peak wavelength and a second peak wavelength, and wherein a first peak luminous intensity at the first peak wavelength is substantially the same as a second peak luminous intensity at the second peak wavelength.

13. The light source according to claim 12, wherein the first peak wavelength falls within a wavelength band of blue light and the second peak wavelength falls within a wavelength band of red light.

14. The light source according to claim 11, wherein the main light source is turned on to perform the main light treatment for 16 hours per day and turned off to perform the dark treatment for 8 hours per day.

15. The light source according to claim 11, wherein the auxiliary light is in an UV spectrum.

16. The light source according to claim 15, wherein the auxiliary light comprises UV light having a third peak wavelength in a wavelength band of UVB.

17. The light source according to claim 16, wherein a third peak luminous intensity at the third peak wavelength is lower than the auxiliary peak luminous intensity at the highest peak wavelength.

18. The light source according to claim 15, wherein the main light source is turned on to perform one or more main light treatments for a predetermined main light treatment period; wherein the auxiliary light source emits the auxiliary light during a last main light treatment period of the one or more main light treatments prior to harvesting of the selected plant.

19. The light source according to claim 15, wherein the auxiliary light source is turned on and off to alternate auxiliary light treatment of supplying the auxiliary light to the selected plant and auxiliary light cut-off treatment.

20. The light source according to claim 19, wherein each of the auxiliary light treatment and the auxiliary light cut-off treatment is performed for one hour.

* * * * *